Nov. 30, 1965    A. W. HAYDON    3,220,264
ADJUSTABLE CYCLING TIMER FOR AIRCRAFT DEICERS
Filed July 12, 1960    4 Sheets-Sheet 1

INVENTOR
ARTHUR W. HAYDON
BY
Bonnie, Edmonds, Morton, Commons & Taylor
ATTORNEY

Nov. 30, 1965    A. W. HAYDON    3,220,264
ADJUSTABLE CYCLING TIMER FOR AIRCRAFT DEICERS
Filed July 12, 1960    4 Sheets-Sheet 2

INVENTOR
ARTHUR W. HAYDON
BY
ATTORNEY

Nov. 30, 1965  A. W. HAYDON  3,220,264
ADJUSTABLE CYCLING TIMER FOR AIRCRAFT DEICERS
Filed July 12, 1960  4 Sheets-Sheet 3
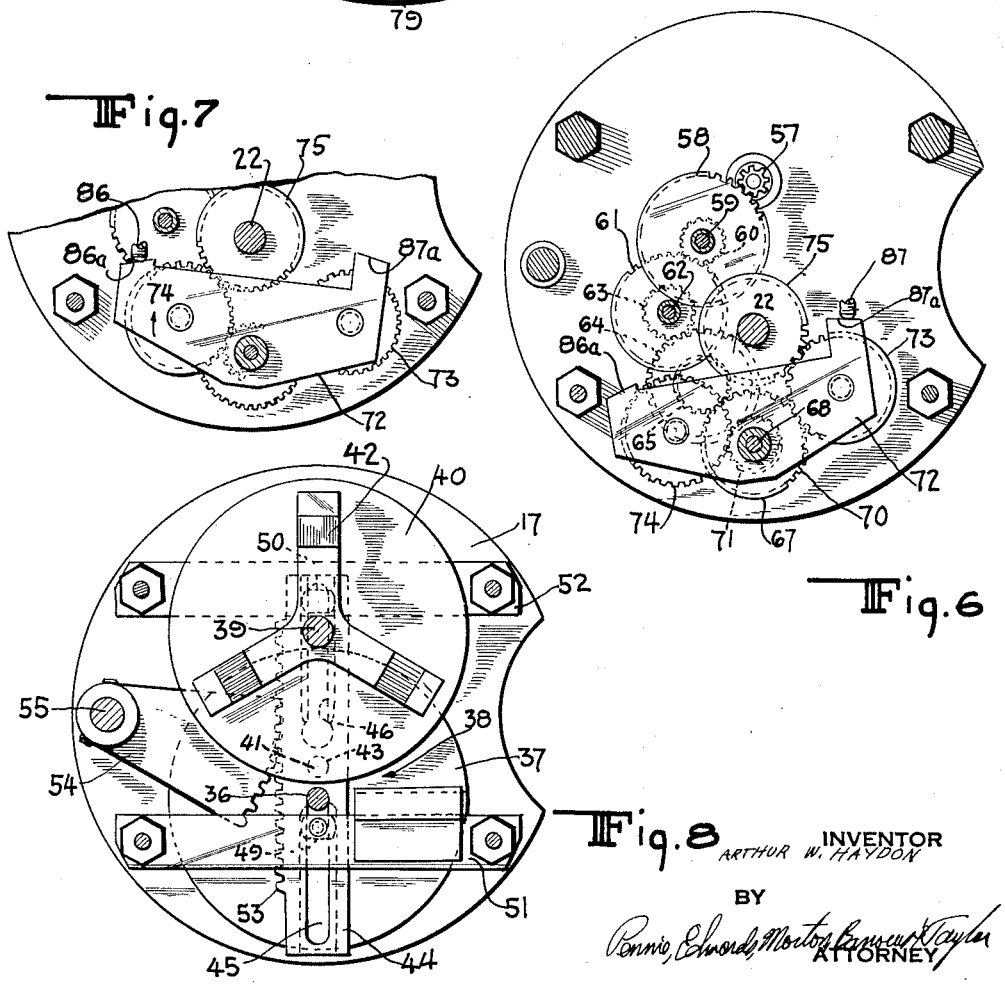
INVENTOR
ARTHUR W. HAYDON
BY
ATTORNEY Nov. 30, 1965  A. W. HAYDON  3,220,264
ADJUSTABLE CYCLING TIMER FOR AIRCRAFT DEICERS
Filed July 12, 1960  4 Sheets-Sheet 4

INVENTOR
ARTHUR W. HAYDON
BY
*Ronnie, Edwards, Morton, Ranamo & Taylor*
ATTORNEY United States Patent Office 3,220,264
Patented Nov. 30, 1965

3,220,264
ADJUSTABLE CYCLING TIMER FOR
AIRCRAFT DEICERS
Arthur W. Haydon, Milford, Conn., assignor to Consolidated Electronics Industries Corp., Waterbury, Conn., a corporation of Delaware
Filed July 12, 1960, Ser. No. 42,264
13 Claims. (Cl. 74—3.52)

The present invention relates to timing devices, and more particularly to a novel and improved form of cycling timer adapted particularly for use in aircraft deicer systems, for example.

In connection with the deicer systems of aircraft, for example, it is frequently desirable and advantageous to employ a cycling timer device or mechanism arranged to energize in sequence and for predetermined periods individual deicing elements located in various critical areas of the aircraft. The arrangement is such that the several areas are deiced individually, in predetermined sequence. Such an arrangement is particularly desirable from the viewpoint that the deicing system as a whole may be of minimum capacity, while providing substantial deicing capacity at each of the individual areas.

A particularly advantageous cycling arrangement for aircraft deicers and the like is described and claimed in the Arthur W. Haydon Patent No. 2,625,661, owned by the assignee of the instant application. The patented system utilizes a series of cams, driven by a constant speed motor and arranged to actuate switches in sequence and thereby effect the sequential energization of a large number of deicing elements. Advantageously, although not necessarily, the present invention is used in conjunction with the system of the Haydon Patent No. 2,625,661, the apparatus of the present invention providing specific improvement in respect of ability to adjust the cycling period to accommodate various atmospheric conditions. Thus, as the atmospheric temperature varies, it frequently is desirable to vary the cycling period of the apparatus so that, for example, with progressively lower temperatures, the cycling period is increased, causing the individual deicing areas to be energized for increased periods of time.

In accordance with one of the specific aspects of the invention, a cycling timer is provided which incorporates novel arrangements for effecting appropriate adjustment of the cycling period to accommodate prevailing atmospheric conditions. In this respect, practical experience has shown that the optimum cycling period varies as a non-linear and substantially irregular function of the prevailing atmospheric temperature. At the same time, it is eminently desirable to provide an aircraft pilot or engineer with a manipulatable control element, the movement of which, in order to effect an adjustment to accommodate a change in atmospheric temperature, varies on a linear relation with the temperature. This is considered to be of substantial importance, as the control operator has a large number of instruments, gauges, etc., to attend, and significant errors in control settings are less apt to occur where linear relationships are observed. It is thus a further specific aspect of the invention to provide an adjustable cycling timer which includes a novel and advantageous adjusting mechanism affording adjustment of the cycling period in substantially non-linear relation to movements of a manual control member, thereby enabling the control member to be utilized in association with a linearly graduated indicator dial. Moreover, the desired control may be obtained automatically, where desirable or expedient, based upon remote intelligence and using selsyns and the like.

As a further specific aspect of the invention, the new adjustable timer incorporates a variable speed, friction transmission device, which is so associated with respect to a constant speed motor and a plurality of timing cams driven thereby as to provide relatively optimum operating conditions for the transmission in order to avoid slippage between the frictionally engaged elements thereof. In this respect, the new device advantageously incorporates a high-speed motor which is connected to a plurality of timing cams through a gear reduction mechanism of a substantial order. The variable transmission mechanism is arranged advantageously as an intermediate part of such gear train, whereby the elements of the transmission are subjected to neither excessively high speeds or excessive torque.

Another advantageous feature of the invention resides in the provision of a novel cycling timer of the type and having the characteristics mentioned above which includes a novel and simplified gear change mechanism, enabling the cycling period to be shifted from normal duration to extra long duration, independently of the normal adjustment of the device. By this means, the control operator may quickly increase the cycling time by a factor of two, for example, without otherwise disturbing or changing the adjusted control setting of the timing device.

For a better understanding of the above and other novel and advantageous features of the invention, reference should be made to the following detailed description and to the accompanying drawings, in which:

FIGS. 5 and 6 are cross-sectional views taken generally along lines 5—5, 6—6, respectively, of FIG. 1;

FIG. 7 is a fragmentary, cross-sectional view similar to FIG. 6, illustrating parts of the apparatus in different adjusted positions; and FIGS. 8 and 9 are cross-sectional views taken generally along lines 8—8, 9—9, respectively, of FIG. 1.

Figure 1:
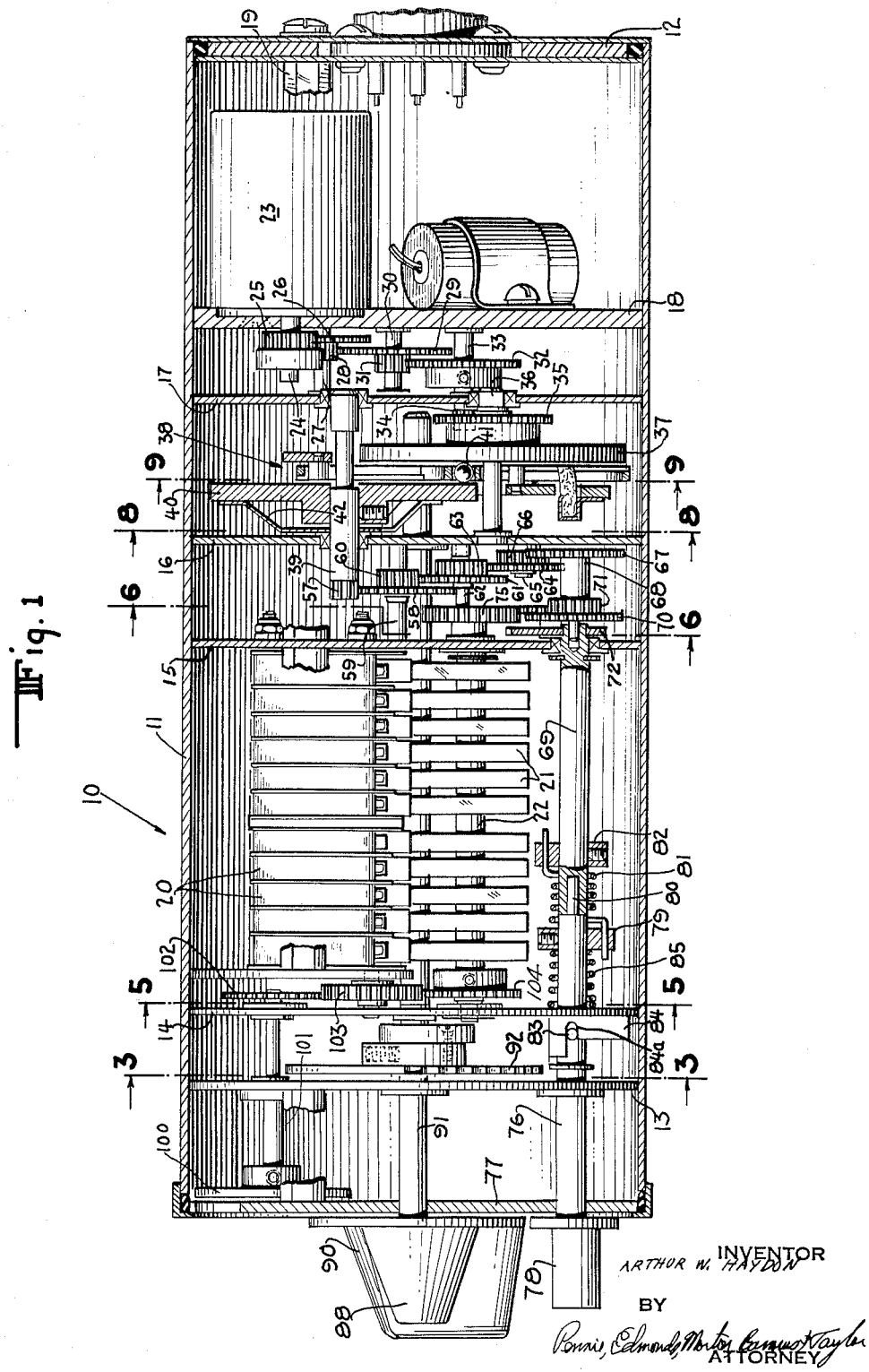
FIG. 1 is a longitudinal, cross-sectional view of a cycling timer incorporating the features of the invention.
Figure 2:
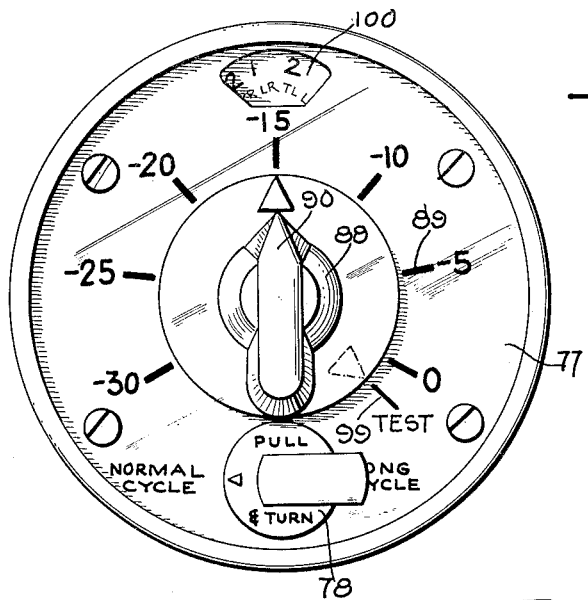
FIG. 2 is a front elevation of the apparatus of FIG. 1.

Referring now to the drawings, the reference numeral 10 designates generally a housing for the new timer, which housing comprises a tubular casing 11, closed at the back by a cover 12, arranged to enclose and protect the mechanism. Within the housing is a frame structure, comprising a plurality of transverse deck plates 13—18 connected in the usual way by a plurality of longitudinal rods or posts indicated generally at 19.

Between the deck plates 14, 15 is mounted a bank of switches 20, advantageously of the snap acting type, arranged for individual actuation by cams 21 fixed to a shaft 22. The shaft 22, which is supported for rotation at its opposite ends by the deck plates 14, 15, is arranged to be rotated at a predetermined speed, as will be described in more detail, and thereby to effect the cyclical actuation of the switches 20 in a desired sequence. Operation of a deicing system, by actuation of the switches 20, may be effected substantially in accordance with the principles described in the above-mentioned Haydon Patent No. 2,625,661.

Referring particularly to FIG. 1, there is mounted on the rear deck plate 18 a constant speed motor 23, advantageously of a high speed type, having an operating speed in the range of 12,000 r.p.m. The shaft 24 of the motor projects forward through the deck plate 18 and mounts a pinion 25 meshing with a reduction gear 26 mounted on a shaft 27, the shaft 27 being supported for rotation by the deck plates 17, 18. The gear 26 has fixed thereto a pinion 28 meshing with a second reduction gear 29 mounted on a shaft 30, which is also supported for rotation by the deck plates 17, 18. A pinion 31 fixed to the gear 29 meshes with a third reduction gear 32 mounted on a shaft 33, which projects forward through the plate 17 and mounts at its forward end a pinion 34. The pinion 34 drives a fourth reduction gear 35 mounted on a shaft 36, which is supported by the deck plates 16, 17 and has fixed thereto a large circular disc or plate 37 forming one part of a variable speed, friction transmission generally indicated at 38.

Journalled by the deck plates 16, 17, in offset relation to the transmission disc 37, is a transmission output shaft 39, to which is keyed for rotation but otherwise slideably supported a second or output disc 40 of the transmission 38. As illustrated, the transmission discs 37, 40 are arranged with overlapping portions facing each other and defining between them a space for receiving an idler ball 41. The disc 40 is urged continuously toward the disc 37, by a spring 42, and thus maintains friction contact between the discs and the ball 41. As will be readily understood, the operating speed ratio between the transmission discs 37, 40 is a function of the distance of the ball 41 from the respective axes of the discs, and desired variation in such operating ratio advantageously is effected by providing for adjustment of the position of the driving ball along an axis extending between the shafts 36, 39.

Figure 9:
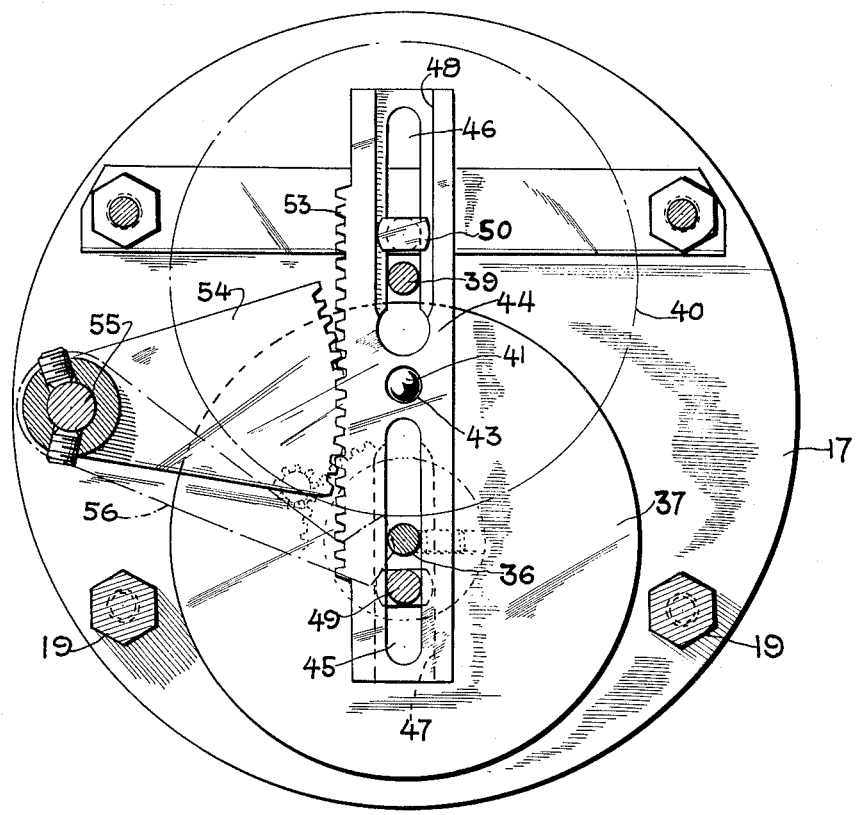

As shown best in FIGS. 8 and 9, the idler ball 41 is mounted in a socket 43, formed in the slide bar 44, which advantageously is formed of anti-friction material, such as phosphor bronze. The slide bar 44 is disposed along the axis extending between the transmission shafts 36, 39 and has elongated slots 45, 46 adjacent each end to accommodate the shafts. The slots 45, 46 are recessed, as indicated at 47, 48, respectively, to receive T-headed studs 49, 50 extending from transverse frame bars 51, 52, the frame bars being secured rigidly to the deck plates 16, 17, respectively. The studs 49, 50 serve to guide the slide bar 44 accurately in movement in the direction of its principal axis, to effect adjusting movement of the idler ball 41 with respect to the transmission discs 37, 40.

Figure 3:
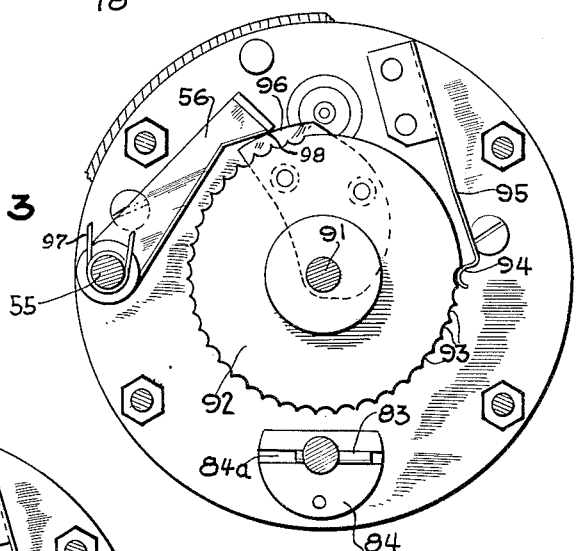
FIG. 3 is a cross-sectional view taken generally along line 3—3 of FIG. 1.
Figure 4:
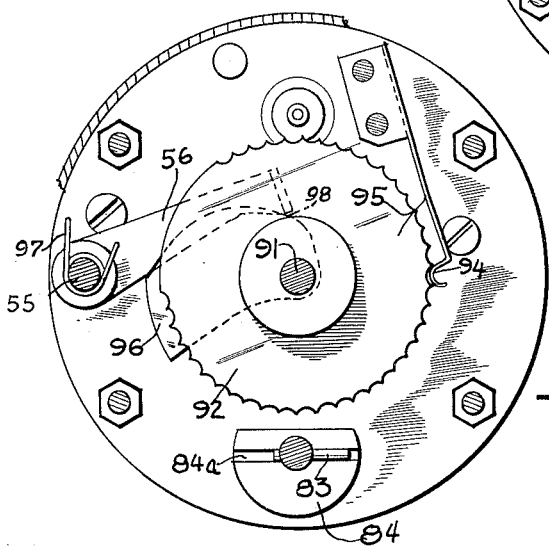
FIG. 4 is a view similar to FIG. 3, illustrating parts of the mechanism in different adjusted positions.

Along one side of the slide bar 44 there is provided an integral gear rack 53 which meshes with a gear segment 54 fixed to a longitudinal shaft 55. The shaft 55 advantageously is journalled by two or more of the deck plates 13–16 and has fixed thereto, adjacent its forward end, a cam follower 56 (FIGS. 3, 4). The arrangement is such that manipulation of the cam follower 56 will effect limited rotation of the shaft 55, which may be referred to as a control shaft, and thereby rotate the gear segment 54 to adjust the position of the slide bar 44 along its axis.

The operating or driving ratio of the transmission 38 may be varied over a relatively wide range by appropriate manipulation of the control shaft 55. By way of example, the speed of the output shaft 39 may be varied from ¼ that of the input shaft 36 (i.e., 4:1 reduction) to 5 times that of the input shaft (i.e., 5:1 increase), providing a total, overall variation of 20:1.

Referring again to FIG. 1, the output shaft 39 of the transmission 38 has, at its forward end, a pinion 57 meshing with a fifth reduction gear 58. The gear 58 is fixed to a shaft 59 supported by the deck plates 15, 16 and mounting a pinion 60. The pinion 60 meshes with a sixth reduction gear 61, mounted on a shaft 62 carrying a pinion 63. A seventh reduction gear 64, mounted on stud shaft 65, meshes with the pinion 63 and drives a pinion 66 which, in turn meshes with an eighth reduction gear 67. The gear 67 is fixed to a shaft 68 journalled at one end in the deck plate 16 and at its other end by the rearward end of a carrier shaft 69, which is supported for limited rotation at its rearward end by the deck plate 15. The shaft 68 mounts, adjacent its forward end, a double gear consisting of a large diameter gear 70 and a smaller diameter gear 71.

Fixed to the end of the carrier shaft 69 is a carrier plate 72 which mounts, on opposite sides of the shaft 69, idler gears 73, 74 meshing respectively with the large and small gears 70, 71 of the double gear. The arrangement is such that the gears 73, 74 are driven in fixed relation, by the shaft 68, the gear 73 being driven at a substantially higher speed, however, than the gear 74. Desirably, but not necessarily, the effective speed of the gear 73 is twice that of the gear 74.

In accordance with one aspect of the invention, the gears 73, 74 are selectively and alternatively meshed with a gear 75 fixed to the cam shaft 22. Accordingly, when the motor 23 is energized and the variable transmission 38 adjusted to a predetermined operating ratio, the cam shaft 22 may be driven at one of two different speeds, depending on whether the gear 73 or 74 is in mesh with the cam shaft input gear 75.

Control of the gears 73, 74, which may be referred to as the gear change mechanism, is effected by rotation of the carrier shaft 69 through a limited arc, between operative limit positions. In accordance with one of the specific aspects of the invention, this is accomplished by rotation of an operating shaft 76, which is journalled by the deck plates 13, 14 and projects forward through a dial plate 77 and has a knob 78 affixed to its forward end. The other end of the operating shaft projects rearwardly beyond the deckplate 14 and has fixed thereto a collar 79. A portion 80 of the operating shaft 76 extends beyond the collar 79 and provides a journal support for the forward end of the carrier shaft 69. The shafts 69, 76 are thus relatively rotatable, but a driving connection is provided therebetween by a spring 81 whose opposite ends are engaged by the collar 79 and a similar collar 82 fixed to the shaft 69.

Advantageously, the shaft 76 mounts a locating pin 83 which, in either of two operative positions of the shaft, is received in a notch 84a of a locking collar 84 secured to the deck plate 14. A spring 85 acts between the plate 14 and the collar 79 to urge the shaft 76 inwardly, tending to seat the pin 83 in the notch 84a, so that shaft 76 normally is held in one of two operative positions 180° apart. Manipulation of the shaft 76 accomplished by pulling the knob 78 outward and rotating it from one operative position to another.

It will be observed in FIGS. 6 and 7, however, that the operative positions of the carrier plate 72 are reached by rotating the plate and the secondary control shaft 69 through a very few degrees of rotation, considerably less than the 180° of rotation contemplated for the operating shaft 76. Accordingly, relative overtravel movement between the shafts 69, 76 is accommodated by the spring 81 and, when the operating shaft 76 is disposed in either of its detent positions, the carrier shaft 69 is urged forcibly toward one or the other of its operative positions. Appropriate abutment means, such as adjustable set screws 86, 87, are mounted on the deck plate 15 for cooperation with abutment surfaces 86a, 87a, respectively, on the carrier plate 72 so that, when the carrier 72 is urged to one of its operative limit positions by the spring 81, the proper driving relationship is established and maintained between the gear 73 or 74 and the cam shaft input gear 75.

In accordance with one of the important features of the invention, adjustment of the cycling period of the timing apparatus (i.e., adjustment of the transmission 38) is effected by a control knob 88 whose motion intentionally produces non-linear adjustment of the cycling period. Accordingly, in a device intended for adjustment in accordance with the prevailing atmospheric temperature, the dial 77 is provided with linear graduations 89 for cooperation with a pointer 90 on the knob, even though the desired cycling periods vary non-linearly with respect to the temperature indicated by the dial graduations. As shown best in FIGS. 1–4, the knob 88 is mounted forward of the dial 77 by a shaft 91, which is journalled by the deck plates 13, 14. Adjacent its rearward end, the shaft 91 has fixed thereto a detent wheel 92 provided about the active portion of its periphery with a series of notches 93 arranged for cooperation with the rounded end 94 of a detent spring 95. With the illustrated arrangement, the shaft 91 is held by the detent means in any one of a series of discrete operating position over the entire active range of adjustment. However, if desirable or expedient, infinitely variable adjustment of the shaft 91 may be provided for by utilizing an appropriate friction detent device.

Secured to the detent wheel 92 for rotation therewith is a cam 96, arranged for cooperation with the cam follower 56, substantially as shown in FIGS. 3 and 4. The specific configuration of the cam is not a significant feature of the invention, it being noted, however, that the appropriate configuration is arrived at on the basis of empirical or other studies indicating desired, optimum cycling times with reference to various prevailing atmospheric temperatures.

The cam follower 56 is urged by a spring 97 to rotate in a clockwise direction, as viewed in FIGS. 3 or 4, so that the active portion 98 of the cam follower is maintained continuously in contact with the surface of the cam. Thus, in the adjusted condition of the device shown in FIG. 3, corresponding to a knob position in which the pointer 90 is opposite the "Test" graduation 99, the cam follower 56 is rotated in a clockwise direction to a maximum or limit position. As the knob is rotated counterclockwise, in the direction of dial indications of lower temperatures, the active radius of the cam 96 becomes increasingly smaller, permitting the cam follower 56 to rotate in a clockwise direction under the influence of the spring 97. This causes the control shaft 55 and gear segment 54 to rotate clockwise and cause the slide bar 44 and idler ball 41 of the transmission 38 to be lowered, progressively decreasing the output ratio of the transmission as the drive ball moves radially inward with respect to the driving disc 37 and radially outward with respect to the driven disc 40.

It will be understood, of course, that the desired linear relation of the control knob 88 and temperature graduations 89 may be observed, regardless of the particular relation between the temperature and the cycling period, since the contour of the cam 96 may be varied to suit particular requirements.

Advantageously, the cycling mechanism is provided with indicating means, such as a dial 100 (FIGS. 1 and 2) indicating which of the individual deicing areas is energized at a particular instant. In the illustrated apparatus, the dial 100 is mounted behind the main dial 77, on a shaft 101, which is journalled by the deck plates 13, 14. The rearward end of the shaft 101 mounts a gear 102 meshing with an idler gear 103 driven by a gear 104 fixed to the cam shaft 22. Accordingly, as the cam shaft 22 is rotated to energize the various deicing areas in sequence, the indicator dial 100 is rotated in synchronism, indicating at all times which of the areas is then energized.

One of the important, practical advantages of the new cycling device resides in the fact that the manually operable control knob 88 may be manipulated with respect to a linearly graduated dial, even though the adjusted setting produced by such manipulations is substantially non-linear and may be substantially irregular over various portions of the operating range of the device. This is of substantial importance in the operation of modern jet aircraft, for example, which operate at very high speeds and have large numbers of dials, gauges, control elements, etc., which must be observed and/or attended quickly and with precision. When linear relationships are observed, an experienced operator may effect a desired, adjusting manipulation quickly and accurately with a minimum of visual attention to the control device. The desired operation is achieved, in accordance with the invention, by providing a variable transmission device in the drive train, which is adjusted by a mechanism including a cam and cam follower. The cam is so contoured that, in any of the linearly adjusted positions of the control knob, the desired cycling period is achieved, even though such period bears a specific non-linear-relation to the control knob adjustment.

Another advantageous feature of the invention resides in the incorporation of the friction transmission device 38 intermediate the input drive, which is a high speed motor, and the cam shaft 22, which may rotate at speeds in the order of less than one revolution per minute. Thus, in the illustrated apparatus, the drive motor 23 operates at about 12,000 r.p.m., constant speed, while the transmission input shaft, mounting the disc 37 operates at about 60 r.p.m. The ultimate rotational cycle of the cam shaft, however, may be on the order of 24 to 480 seconds, or as much as 960 seconds if the gear change mechanism is set for slow cycling, equivalent to a rotational speed on the order of 2½ to 1/16 r.p.m. By disposing the transmission judicially intermediate the gear reduction train, the torque and speed conditions under which the transmission must operate are near optimum, enabling the transmission device to be of the simplified character illustrated. In the illustrated apparatus, a first reduction of 200:1 is effected between the motor and transmission input and a second reduction of 120:1 or 240:1 is effected between the transmission output and the cam shaft, depending upon the setting of the transmission carrier plate 72. A further reduction of 4:1 (or increase of 5:1) is made possible by the variable transmission 38 so that overall, the speed ratio of the new mechanism varies between 192,000:1 and 4,800:1.

A further advantageous feature of the invention resides in the provision of the simplified gear change mechanism for changing the drive ratio of the timer mechanism, advantageously by a factor of two, independently of the adjusted setting thereof. The simplified arrangement provides for quick, positive gear change, but involves a minimum of precision manufacture. The control knob 78, for example, may be rotated through a substantial arc, between readily ascertainable limit positions, while the carrier shaft 69 rotates through a small arc, overtravel accommodation and positive operation being provided by the series-connected spring 81. Accurate positioning of the selected gear is achieved by use of the adjustable abutment screws 86, 87.

It should be understood, however, that the specific form of the invention therein illustrated and described is intended to be representative only, as certain changes may be made therein without departing from the clear teachings of the disclosure. Accordingly, reference should be made to the following appended claims in determining the full scope of the invention.

I claim:

1. In a cycling mechanism or the like having an output shaft, the combination of a drive motor, a variable transmission driven by said motor and including an adjustable member interposed between the transmission input and output elements for varying the speed ratio of said elements, a manually adjustable control member for effecting adjustment of said speed ratio, a linearly graduated scale cooperating with said control member to indicate the manually adjusted position thereof, and cam means interconnecting said adjustable member and said control member, said cam means being connected to and actuated by said manually adjustable control member and having an operative contour such that said speed ratio is varied on a predetermined non-linear relationship relative to adjustment of said control member.

2. The cycling mechanism of claim 1, in which the transmission comprises a pair of discs and an idler ball interposed between the discs, said discs disposed in an overlapping relation, the centers of said discs defining an axis of transmission and the adjustable member comprises means for movably positioning said idler ball along said axis of transmission with respect to the axes of rotation of said discs, speed reduction means having an overall speed ratio on the order of 192,000 or more to 1 are interposed between said drive motor and the output shaft of said mechanism, and said transmission is included in said speed reduction means to have an input speed substantially less than the speed of said motor and an output speed substantially higher than the speed of the output shaft of the mechanism.

3. The cycling mechanism of claim 2, in which the input speed of said transmission is on the order of one two-hundredth the speed of the drive motor, and the output speed of said transmission is on the order of 120 or more times the speed of the output shaft of the mechanism.

4. The cycling mechanism of claim 1, which includes gear change means operable independently of said transmission for changing the speed ratio between the output shaft of the mechanism and the drive motor, said gear change means including a carrier mounted for limited rotation by a carrier shaft and carrying alternatively operable gears, abutment means limiting rotation of said carrier shaft and carrier, and spring means for urging said carrier toward its limit positions.

5. The cycling mechanism of claim 4, in which said spring means comprises an operating shaft rotatable through an arc substantially greater than the arc of rotation of said carrier shaft and engaged by detent means in operative limit positions, and a spring connecting said operating and carrier shafts.

6. A gear change mechanism for incorporation in a gear train comprising, a carrier shaft mounted for rotation, a carrier mounted on said shaft and supporting alternatively operable gears, abutment means limiting rotation of said carrier and shaft toward alternatively operable limit positions, and spring means connected at one end to said carrier, a control member rotatable through a greater arc than said carrier shaft and connected to the other end of said spring means for yieldably urging said carrier shaft into its operative limit positions determined by said abutment means.

7. The gear change mechanism of claim 6, in which the spring means comprises an operating shaft, means supporting said operating shaft for rotation through an arc substantially greater than the maximum arc of rotation of said carrier shaft, detent means for retaining said operating shaft in limit positions, and a spring connecting said shafts.

8. The gear change mechanism of claim 7, in which said operating and carrier shafts are coaxially disposed, and one end of one of the shafts is supported by one end of the other of the shafts.

9. The gear change mechanism of claim 6, in which said abutment means comprise adjustable set screws positioned to engage said carrier in its limit positions.

10. A cycling mechanism for an aircraft deicer system or the like comprising a plurality of switches arranged side by side in a bank, a cam shaft disposed adjacent the switches and mounting a plurality of cams positioned for individual actuation of the switches, a drive train for the cam shaft including a drive motor and a speed reduction train, said speed reduction train including a variable transmission device, said transmission device including an adjustable member, means including a rotatable control shaft for manipulating said adjustable member, a control cam for effecting limited rotation of said control shaft, a manually operable member for rotating said control cam, and a linearly graduated scale cooperating with said manually operable member for indicating the position thereof, said cam and control shaft being so related as to effect predetermined non-linear speed adjustment relative to movements of said manually operable member.

11. The cycling timer of claim 10, in which the variable transmission device includes friction drive members, and said transmission device is incorporated in said speed reduction train intermediate its input and output.

12. The cycling timer of claim 11, in which a first reduction on the order of 200:1 is effected between the motor output and the transmission input, and a further reduction on the order of at least 120:1 is effected between the transmission output and the cam shaft, said motor operating at a speed on the order of 12,000 r.p.m.

13. The cycling timer of claim 10, in which said transmission device comprises a pair of friction discs and an idler ball interposed therebetween, said adjustable member movably positions said idler ball and is guided for movement along an axis extending between the respective axes of rotation of said discs, said adjustable member is provided at one side with a gear rack, and said control shaft mounts a gear segment meshed with said rack.

References Cited by the Examiner

UNITED STATES PATENTS

| | | | |
|---|---|---|---|
| 1,428,460 | 9/1922 | Soden-Fraunhofen | 74—470 |
| 2,084,396 | 6/1937 | Hennessy | 74—190 X |
| 2,094,669 | 10/1937 | Pratt | 74—190 X |
| 2,163,616 | 6/1939 | McGihon | 74—194 X |
| 2,451,033 | 10/1948 | Krebs | 74—200 |
| 2,478,407 | 8/1949 | Lean | 74—200 X |

FOREIGN PATENTS 554,369  2/1923  France.

BROUGHTON G. DURHAM, *Primary Examiner.*